(12) United States Patent
Nomura et al.

(10) Patent No.: US 9,448,054 B2
(45) Date of Patent: Sep. 20, 2016

(54) THROTTLE OPENING DETECTION DEVICE (71) Applicant: HONDA MOTOR CO., LTD., Minato-ku, Tokyo (JP)

(72) Inventors: Yoshihiro Nomura, Saitama (JP); Yuichi Kawasaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 95 days.

(21) Appl. No.: 13/803,603

(22) Filed: Mar. 14, 2013

(65) Prior Publication Data
US 2013/0257416 A1 Oct. 3, 2013

(30) Foreign Application Priority Data
Mar. 28, 2012 (JP) ................. 2012-072907

(51) Int. Cl.
| | | |
|---|---|---|
| *G01B 7/14* | (2006.01) | |
| *G01B 7/30* | (2006.01) | |
| *B62K 23/04* | (2006.01) | |
| *F02D 9/10* | (2006.01) | |
| *F02D 11/02* | (2006.01) | |
| *G01D 5/14* | (2006.01) | |
| *F02D 9/02* | (2006.01) | |

(52) U.S. Cl.
CPC ............... *G01B 7/30* (2013.01); *B62K 23/04* (2013.01); *F02D 9/105* (2013.01); *F02D 11/02* (2013.01); *G01D 5/145* (2013.01); *F02D 2009/0294* (2013.01)

(58) Field of Classification Search
CPC ........... G01B 7/30; G01B 7/14; G05G 1/08; G05G 1/00; B62K 23/04; F02D 11/10
USPC ............. 324/207.2, 207.22, 207.24, 207.11, 324/207.25, 207; 74/500.5, 501.6, 504, 74/482, 485, 488, 491, 511; 701/22, 70
See application file for complete search history.

(56) References Cited

U.S. PATENT DOCUMENTS

| | | | | |
|---|---|---|---|---|
| 5,093,617 | A | * | 3/1992 | Murata ........................ 324/235 |
| 5,781,005 | A | * | 7/1998 | Vig et al. .................. 324/207.2 |
| 6,879,150 | B2 | * | 4/2005 | Sekiya ..................... 324/207.25 |
| 7,352,173 | B2 | * | 4/2008 | Shimomura et al. .... 324/207.25 |

(Continued)

FOREIGN PATENT DOCUMENTS

| | | |
|---|---|---|
| EP | 1647435 A1 | 4/2006 |
| EP | 2192037 A1 | 6/2010 |

(Continued)

*Primary Examiner* — Arleen M Vazquez
*Assistant Examiner* — Neel Shah
(74) *Attorney, Agent, or Firm* — Carrier Blackman & Associates, P.C.; Joseph P. Carrier; Jeffrey T. Gedeon (57) ABSTRACT

A throttle opening detection device includes a rotor which is rotated in an interlocking manner by manipulation of an acceleration grip which is mounted together with the rotor on a handlebar. First magnets are arranged near a peripheral portion of one side surface of the rotor along the circumferential direction of the rotor, while second magnets are respectively laminated to the first magnets, and have opposite polarities to the first magnets. The first magnets with the second magnets laminated thereto are disposed with a set spacing therebetween. A magnetic sensor for detecting a magnetic force generated by all the magnets is arranged to oppose, with a clearance therebetween, the one side surface of the rotor in which the magnets are arranged, in an axial direction of the rotor.

15 Claims, 6 Drawing Sheets

(56) References Cited

U.S. PATENT DOCUMENTS

2004/0065165 A1* 4/2004 Sekiya et al. ............... 74/491
2005/0251301 A1 11/2005 Suzuki
2006/0082361 A1* 4/2006 Hino et al. ............... 324/207.2
2010/0132500 A1* 6/2010 Cominetti et al. ............ 74/504

2012/0006144 A1 1/2012 Min

FOREIGN PATENT DOCUMENTS

JP 2006-112284 A 4/2006
JP 2010-168025 A 8/2010

* cited by examiner

THROTTLE OPENING DETECTION DEVICE

CROSS-REFERENCE TO RELATED APPLICATIONS

The present invention claims priority under 35 USC 119 based on Japanese Patent Application No. 2012-072907, filed on Mar. 28, 2012. The entire subject matter of this priority document, including the specification, claims and drawings thereof, is incorporated by reference herein.

BACKGROUND OF THE INVENTION

1. Technical Field

The present invention relates to a throttle opening detection device for detecting opening of a throttle in a motorcycle or other vehicle with a rotatable acceleration grip.

2. Background Art

In a motorcycle, an acceleration grip is mounted on a handle bar. When a rider rotates the acceleration grip in the circumferential direction, a throttle valve mounted on an internal combustion engine performs an open/close operation along with such rotation of the acceleration grip.

It is necessary to control the open/close operation of the throttle valve in such a manner that an open/closing amount of the throttle valve corresponds to a rotational amount of the acceleration grip. Accordingly, there has been known a technique where a throttle opening detection device for detecting a rotational amount of an acceleration grip is mounted on a handle bar of the motorcycle or other vehicle.

This type of throttle opening detection device includes a rotor which is rotated in an interlocking manner by manipulation of the acceleration grip. As shown in FIG. 6 of JP-A-2006-112284, for example, a plurality of magnets are mounted on the rotor. Accordingly, positions of the plurality of magnets are changed following the rotation of the rotor.

The throttle opening detection device further includes a magnetic sensor such as a Hall element. The magnetic sensor outputs an electric signal corresponding to a magnetic flux density of the magnet at a detecting position. A rotational amount (rotational angle) of the rotor and, eventually, a rotational amount of the acceleration grip can be obtained based on the electric signal output by the magnetic sensor.

As shown in FIG. 6 of JP-A-2006-112284, the magnetic sensor is conventionally arranged outside the rotor in the radial direction. The reason is as follows. Assuming that the magnets and the magnetic sensor have such a positional relationship, when the magnetic flux density corresponding to a rotational angle of the rotor is plotted on a graph, the correlation becomes linear and hence, an electric signal which the magnetic sensor outputs and, eventually, a rotational amount of the acceleration grip can be easily evaluated with high accuracy.

However, due to such a constitution, a location where the magnetic sensor is arranged is limited and hence, the degree of freedom in the layout of arrangement of other parts is decreased. Further, it is difficult to avoid making the throttle opening detection device large in size along the radial direction of the rotor.

SUMMARY OF THE INVENTION

The present invention has been made to overcome the above-mentioned drawbacks of the conventional throttle opening detection device, and it is an object of the present invention to provide a throttle opening detection device which has a large degree of freedom in the layout of arrangement and can miniaturize or reduce the size of the throttle opening detection device in the radial direction of the rotor.

To achieve the above-mentioned object, according to a first aspect of the present invention there is provided a throttle opening detection device including: a rotor which is mounted on a handle bar and is rotatable in an interlocking manner by manipulation of an acceleration grip also mounted on the handle bar; at least two magnets which are mounted on the rotor; a magnetic sensor which detects a magnetic force generated by the magnets; and a housing which houses the rotor and the magnetic sensor and is mounted on the handle bar, wherein the magnets are arranged in the vicinity of a peripheral portion of an end surface of the rotor and adjacent to each other along the circumferential direction of the rotor, and the magnetic sensor is arranged to face the rotor end surface in an opposed manner in the axial direction of the rotor.

Thus, contrary to the conventional technique in which a magnetic sensor is arranged outside a rotor in the radial direction in a throttle opening detection device, according to the present invention, the magnetic sensor is arranged to oppose the rotor along the axial direction of the rotor. Accordingly, a size of the housing along the radial direction of the rotor can be decreased. The miniaturization or reduction in size of the throttle opening detection device can be realized by an amount corresponding to the decrease of the size of the housing. Also, the degree of freedom in the layout of arrangement of parts can be increased.

Further, when a magnetic flux density with respect to a rotational angle of the rotor is plotted on a graph, a linear correlation can be acquired in a relatively wide range. Accordingly, an electric signal which the magnetic sensor outputs and, eventually, a rotational amount of the acceleration grip can be easily evaluated with high accuracy.

According to a second aspect of the present invention, in addition to the first aspect, the magnetic sensor may be arranged at a position on a side opposite to the acceleration grip with the rotor sandwiched therebetween, for example.

According to a third aspect of the present invention, in addition to the first or second aspect, the magnets are spaced apart from each other in the direction along the circumferential direction of the rotor. In this case, a further favorable linear correlation is maintained between a rotational angle of the rotor and a magnetic flux density. Therefore, the difference in a magnetic flux density and an electric signal corresponding to the difference in rotational angle of the rotor can be easily recognized. Accordingly, a rotational amount of the acceleration grip, and hence, throttle opening can be evaluated with high accuracy.

According to a fourth aspect of the present invention, in addition to the first or second aspect, in an alternative arrangement of the present invention at least two of the magnets may be spaced apart from each other along the circumferential direction of the rotor, and at least an additional one of the magnets may be arranged between the magnets which are spaced apart from each other. Due to such a constitution, the balance of a magnetic force in an intermediate range is improved whereby the detection accuracy is further enhanced.

According to a fifth aspect of the present invention, in addition to any of the first-fourth aspects, with the magnets that are spaced-apart from each other along the circumferential direction of the rotor, it is preferable to set the spaced-apart distance to a distance at which the degree of change in magnetic flux density corresponding to throttle opening in an intermediate range of throttle opening can be decreased. In this case, in the above-mentioned linear correlation, a magnetic flux density and an electric signal are changed with high sensitivity along with a change in a rotational angle of the rotor. Accordingly, a rotational amount of the acceleration grip, and hence, the degree of throttle opening can be determined with higher accuracy.

According to a sixth aspect of the present invention, in addition to any of the first-fifth aspects, the throttle opening detection device may further include additional magnets which have different magnetic fluxes are respectively laminated to the at least two magnets which are mounted on the rotor. In this case, the additional magnets function as so-called back yokes. Even when such a constitution is adopted, the at least two magnets mounted on the rotor and the additional magnets are arranged to face or oppose the magnetic sensor in an axial direction of the rotor, and hence, a thickness of all of the magnets of the throttle opening detection device can be decreased in comparison to the conventionally known technique.

Figure 5:
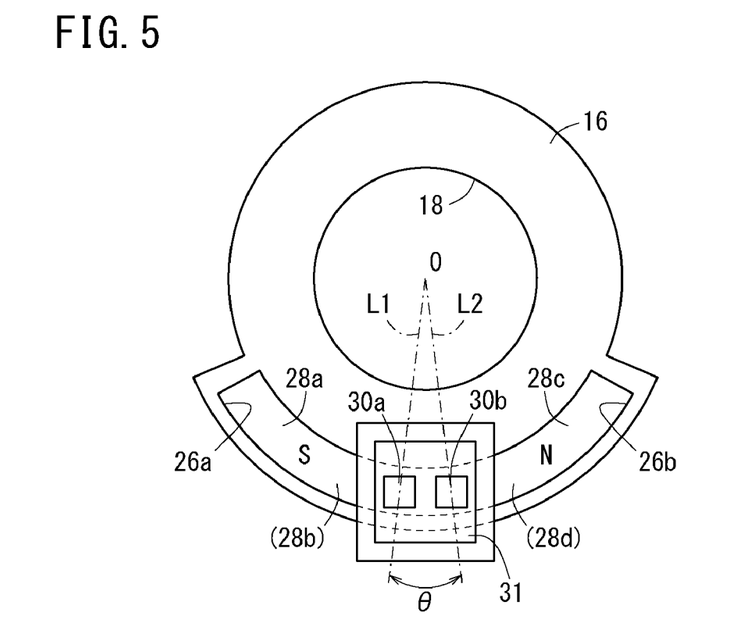
FIG. 5 is a plan view of an essential part showing the positional relationship among a rotor, magnets and a Hall element which constitute a throttle opening detection device according to still another embodiment of the present invention.

According to a seventh aspect of the present invention, in addition to any of the first-sixth aspects, the magnetic sensor may be formed of a plurality of magnetic sensor portions arranged in a spaced-apart manner from each other along the circumferential direction of the rotor. In this case, assuming imaginary lines which connect the center of rotation of the rotor and the plurality of magnetic sensor portions as L1, L2, these imaginary lines L1, L2 are set so as to intersect with each other at a predetermined angle θ which exceeds 0° and less than 90°, as shown in FIG. 5.

For example, when two magnetic sensor portions are used, two outputs which differ in phase by an amount corresponding to the angle θ are obtained by one magnetic sensor portion and the other magnetic sensor portion. The differential between these two outputs is calculated, and when an abnormal value is recognized, it is possible to determine that a malfunction occurs in the magnetic sensor.

Advantages of the Invention

According to the first aspect of the present invention, the throttle opening detection device is constituted by arranging the magnetic sensor along the axial direction of the rotor and hence, a size of the housing along the radial direction of the rotor can be decreased. Accordingly, the throttle opening detection device can be reduced in size/miniaturized by an amount corresponding to the decrease of the size of the housing and also the degree of freedom in the layout of arrangement of parts can be increased.

Further, the favorable linear correlation can be acquired between a rotational angle of the rotor and a magnetic flux density. Accordingly, an electric signal which the magnetic sensor outputs can be easily evaluated with high accuracy and, eventually, a rotational amount of the acceleration grip (throttle opening) can be determined with high accuracy.

According to the second aspect of the present invention, the above-mentioned linear correlation is improved.

According to the third aspect of the present invention, the further improved linear correlation can be maintained between a rotational angle of the rotor and a magnetic flux density and hence, the throttle opening can be easily evaluated with higher accuracy.

According to the fourth aspect of the present invention, the balance of a magnetic force in the intermediate range can be improved and hence, the detection accuracy is further enhanced.

According to the fifth aspect of the present invention, in the above-mentioned linear correlation, a magnetic flux density and an electric signal change with high sensitivity along with a change in a rotational angle of the rotor. Accordingly, the throttle opening can be determined with higher accuracy.

Further, according to the sixth aspect of the present invention, even when additional magnets which function as back yokes are provided, the magnets and the magnetic sensor are arranged to face each other in an opposed manner in the axial direction of the rotor and hence, a thickness of the magnets can be decreased.

According to the seventh aspect of the present invention, it is possible to easily determine whether or not a malfunction occurs in the magnetic sensor.

DETAILED DESCRIPTION OF PRESENT EMBODIMENTS FOR CARRYING OUT THE INVENTION

Hereinafter, exemplary, non-limiting embodiments of a throttle opening detection device according to the present invention are explained in detail in conjunction with attached drawings.

Figure 1:
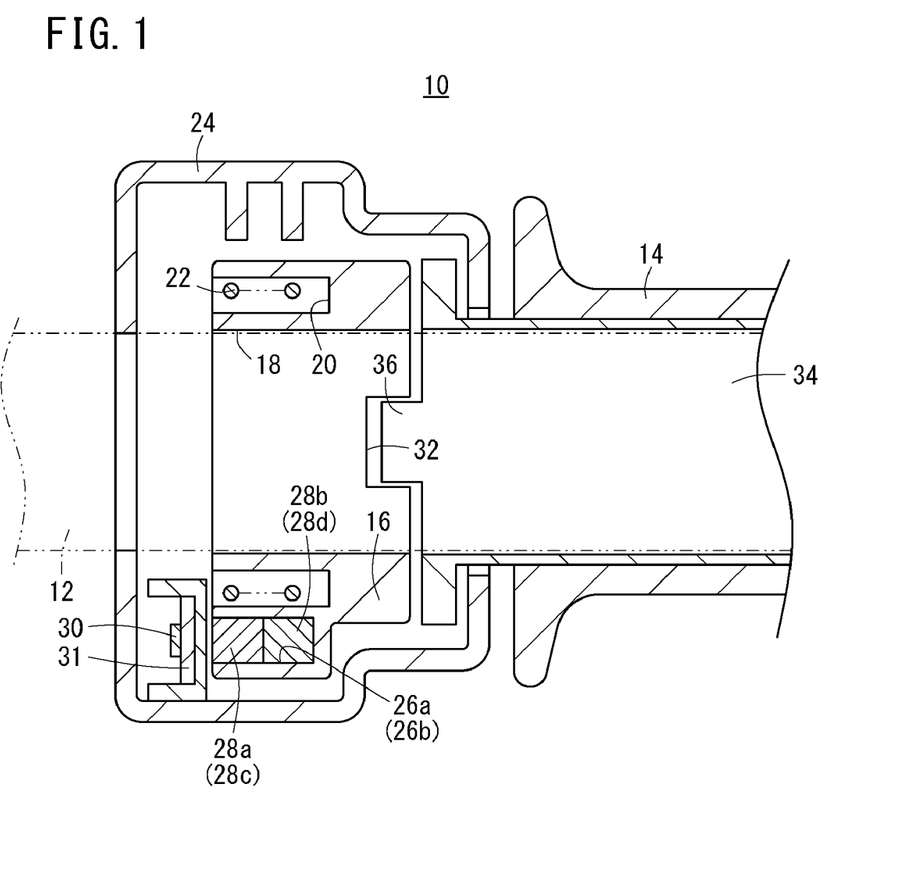
FIG. 1 is a schematic longitudinal cross-sectional view of a throttle opening detection device according to an exemplary embodiment of the present invention.

FIG. 1 is a schematic longitudinal cross-sectional view of a throttle opening detection device 10 according to a first embodiment of the present invention. The throttle opening detection device 10 is mounted on a handle bar 12 of a motorcycle. The device 10 includes a rotor 16 rotational amount (rotational angle) of the rotor 16, when an acceleration grip 14 is rotated due to a manipulation by a rider, is converted into an electronic signal which is transmitted to an electronic control unit (ECU or the like) not shown in the drawing.

For mounting, an insertion hole 18 is formed in the rotor 16 in a penetrating manner, and the handle bar 12 is inserted into the insertion hole 18. A predetermined clearance is formed between an inner wall of the insertion hole 18 and the handle bar 12 and hence, the rotor 16 is rotatable along the circumferential direction of the handle bar 12.

An accommodation groove 20 is formed in the rotor 16 along the axial direction (the lateral direction in FIG. 1) of the rotor 16, and a return spring 22 is accommodated in the accommodating groove 20. Although not shown in the drawing, one end of the return spring 22 is engaged with the rotor 16, and the other end of the return spring 22 is engaged with a housing 24.

Figure 2A:
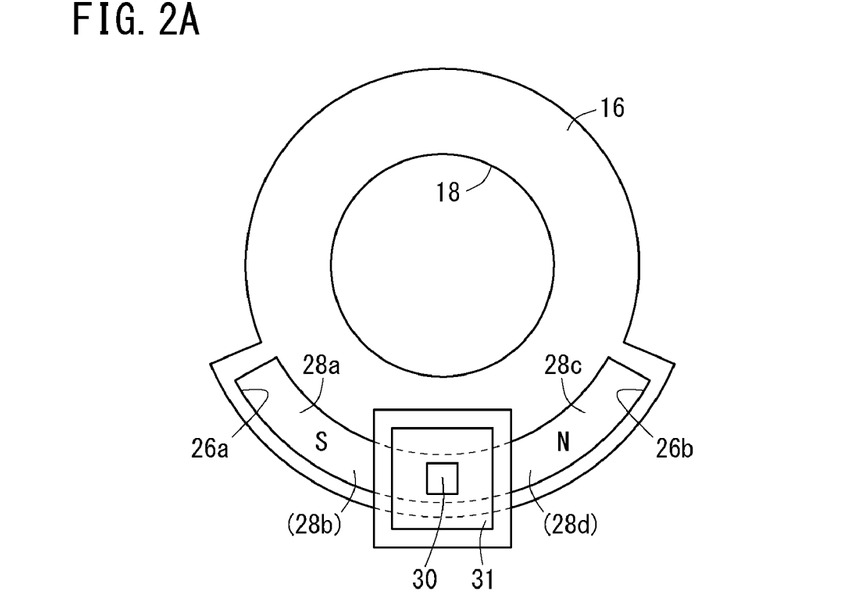
FIGS. 2A and 2B are respectively a plan view of an essential part and a side view of the essential part showing the positional relationship among a rotor, magnets and a magnetic sensor (Hall element) which constitute the throttle opening detection device shown in FIG. 1.

A portion of the rotor 16 projects outwardly in the radial direction. As shown in FIGS. 1 and 2A, two fitting recessed portions 26a, 26b are formed by indenting the rotor 16 in the vicinity of a peripheral portion of the projecting portion such that the fitting recessed portions 26a, 26b are arranged adjacent to each other in the circumferential direction of the rotor. Magnets 28a, 28b are fitted into one fitting recessed portion 26a, and magnets 28c, 28d are fitted into the other fitting recessed portion 26b. That is, in this embodiment, four magnets 28a to 28d are mounted on one end surface of the rotor 16, the magnets 28a, 28b are laminated in the fitting recessed portion 26a, and the magnets 28c, 28d are laminated in the fitting recessed portion 26b. Further, in view of the relationship that the fitting recessed portions 26a, 26b are arranged adjacent to each other, the magnet 28a is arranged adjacent to the magnet 28c, and the magnet 28b is arranged adjacent to the magnet 28d.

The magnets 28a, 28d have the same polarity, and the magnets 28b, 28c have the same polarity opposite to the polarity of the magnets 28a, 28d. For example, the magnets 28a, 28d have an S pole, and the magnets 28b, 28c have an N pole.

The fitting recessed portions 26a, 26b are slightly spaced apart from each other in the circumferential direction of the rotor. Accordingly, the magnets 28a, 28b are also spaced apart from the magnets 28c, 28d in the circumferential direction of the rotor. Due to such spacing, as described later, when a magnetic flux density with respect to a rotational angle of the rotor 16 is plotted on a graph, a correlation between the rotational angle and the magnetic flux density becomes linear.

A magnetic flux density of a magnetic field generated by the magnets 28a to 28d is detected by a Hall element 30 which constitutes a magnetic sensor. The Hall element 30 outputs an electric signal corresponding to magnitude of the detected magnetic flux density.

As shown in FIG. 2A, the Hall element 30 is supported on a board 31, and is arranged at a position where the Hall element 30 faces one side surface of the rotor 16 on which the magnets 28a to 28d are mounted in an opposed manner. In other words, the Hall element 30 is arranged at a position on a side of the rotor 16 opposite to the acceleration grip 14 with the rotor 16 sandwiched therebetween. Thus, while a Hall element (magnetic sensor) has conventionally been arranged outside the rotor in the radial direction in a throttle opening detection device according to the known technique, in this embodiment, the Hall element 30 is arranged along the axial direction of the rotor 16.

Figure 2B:
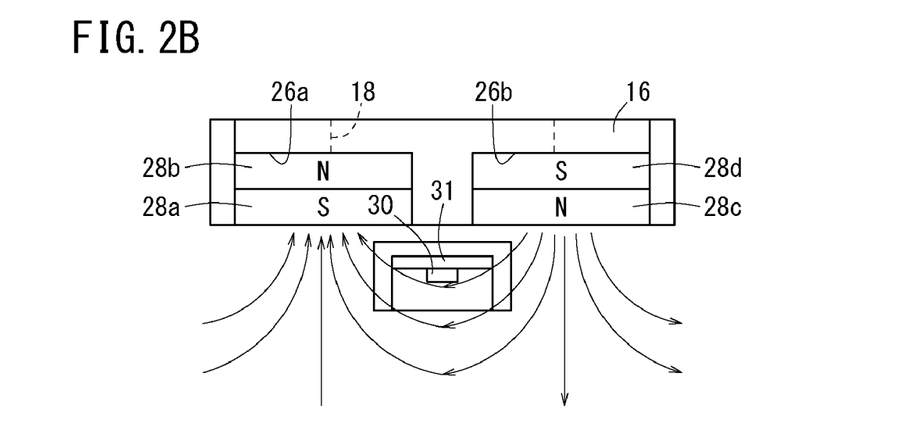

As shown in FIG. 2B, in this case, the Hall element 30 faces a clearance formed between the fitting recessed portions 26a, 26b which are spaced apart from each other in an opposed manner. In other words, the Hall element 30 is positioned between the magnets 28a, 28b on the one side and the magnets 28c, 28d on the other side.

The rotor 16 and the Hall element 30 are housed in the housing 24. Accordingly, the rotor 16 and the Hall element 30 are protected.

On a right end portion of the rotor 16 in FIG. 1, an engaging recessed portion 32 is formed by indenting. On the other hand, on a right end portion of a throttle pipe 34 on which the acceleration grip 14 is fitted in FIG. 1, an engaging projecting portion 36 is formed in a projecting manner. The engaging projecting portion 36 is engaged with the engaging recessed portion 32. Accordingly, when the throttle pipe 34 is rotated along with the rotation of the acceleration grip 14, the engaging projecting portion 36 pushes an inner wall of the engaging recessed portion 32. As a result, the rotor 16 is rotated.

The throttle opening detection device 10 according to this embodiment has the above-mentioned basic constitution, and the manner of operation and advantageous effects of the throttle opening detection device 10 are explained next.

As described previously, in the throttle opening detection device 10, the Hall element 30 (magnetic sensor) is arranged along the axial direction of the rotor 16. That is, it is unnecessary to arrange the Hall element 30 outside the rotor 16 in the radial direction as has been conventionally done. Thereby, a size of the housing 24 along the radial direction of the rotor 16 can be decreased by an amount correspondingly. As a result, the throttle opening detection device 10 can be reduced in size/miniaturized.

Since it is unnecessary to arrange the Hall element 30 outside the rotor 16 in the radial direction, the degree of freedom in the layout of arrangement of parts can be increased.

In an initial state where the rotor 16 is not rotated, as shown in FIG. 2A and FIG. 2B, the Hall element 30 is positioned between the magnets 28a, 28b on the one side and the magnets 28c, 28d on the other side. Here, between the magnets 28a, 28b and the magnets 28c, 28d, a magnetic field where lines of magnetic force are directed as shown in FIG. 2B is generated.

When a rider rotates the acceleration grip 14 mounted on the distal end of the handle bar 12 of the motorcycle in the circumferential direction, the throttle pipe 34 is rotated along with the rotation of the acceleration grip 14. As a result, the engaging projecting portion 36 formed on the throttle pipe 34 pushes the inner wall of the engaging recessed portion 32 formed on the rotor 16 and hence, the rotor 16 is rotated. Here, the return spring 22 is pulled and extended.

Along with such rotation, positions of the magnets 28a to 28d mounted on the rotor 16 are changed. Accordingly, a magnetic flux density in the vicinity of the Hall element 30 is changed. The Hall element 30 transmits an electric signal to the ECU and the like with an output amount corresponding to a change amount of the magnetic flux density.

Figure 3:
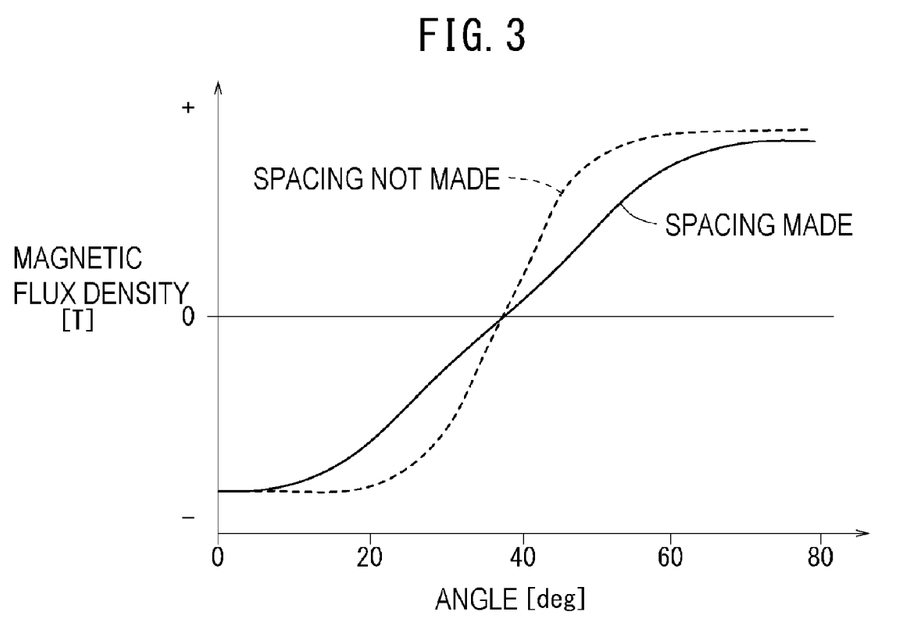
FIG. 3 is a graph showing the relationship between a rotational angle of the rotor and a magnetic flux density in the throttle opening detection device shown in FIGS. 1, 2A and 2B.

The relationship between a rotational angle of the rotor 16 and magnitude of a magnetic flux density is shown in FIG. 3. In FIG. 3, a solid line indicates the case where the magnets 28a, 28b and the magnets 28c, 28d are spaced apart from each other in the circumferential direction of the rotor, and a broken line indicates the case where the magnets 28a, 28b and the magnets 28c, 28d are arranged adjacent to each other without being spaced part from each other.

It is understood from FIG. 3 that both the solid line and the broken line indicate that the magnetic flux density is changed in a straight line or substantially straight line shape with respect to a change in a rotational angle of the rotor 16 in a so-called intermediate range. That is, the correlation between the rotational angle of the rotor 16 and the magnetic flux density is linear. Accordingly, magnitude of a rotational amount of the acceleration grip 14 and magnitude of an electric signal which the Hall element 30 transmits based on the detected magnetic flux density correspond to each other. Accordingly, a rotational amount of the acceleration grip 14, and hence, throttle opening can be easily determined.

Here, to compare the intermediate range of the solid line and the intermediate range of the broken line in FIG. 3, the solid line has the longer region formed in a substantially straight line shape since the gradient of the solid line is smaller than the gradient of the broken line. This means that by providing the appropriate spaced-apart distance between the magnets 28a, 28b and the magnets 28c, 28d, in a relatively wide region of the intermediate range, the degree of change in magnetic flux density with respect to the degree of change in a rotational amount (throttle opening) of the acceleration grip 14 can be lowered. That is, a so-called smoothing effect appears.

Under such a state, a magnetic flux density and an electric signal are changed with high sensitivity along with a change in a rotational amount of the acceleration grip 14 in a wide range. Accordingly, the degree of a rotational amount of the acceleration grip 14 can be accurately determined based on the difference in an output amount of the electric signal.

That is, when the magnets 28a, 28b and the magnets 28c, 28d are spaced apart from each other, in a wide region at the intermediate range, a rotational amount of the acceleration grip 14 (a rotational amount of the rotor 16) can be determined with high accuracy.

As described above, according to the throttle opening detection device 10 of this embodiment, the degree of freedom in the layout of arrangement of parts can be increased, and the miniaturization of the throttle opening detection device 10 in the direction along the radial direction of the rotor 16 can be also realized. Further, the throttle opening can be also evaluated with high accuracy.

When a driver releases his hand from the acceleration grip 14, the extended return spring 22 returns to an original position due to elasticity thereof and hence, the rotor 16, the throttle pipe 34 and the acceleration grip 14 return to their original or neutral positions.

Figure 4A:
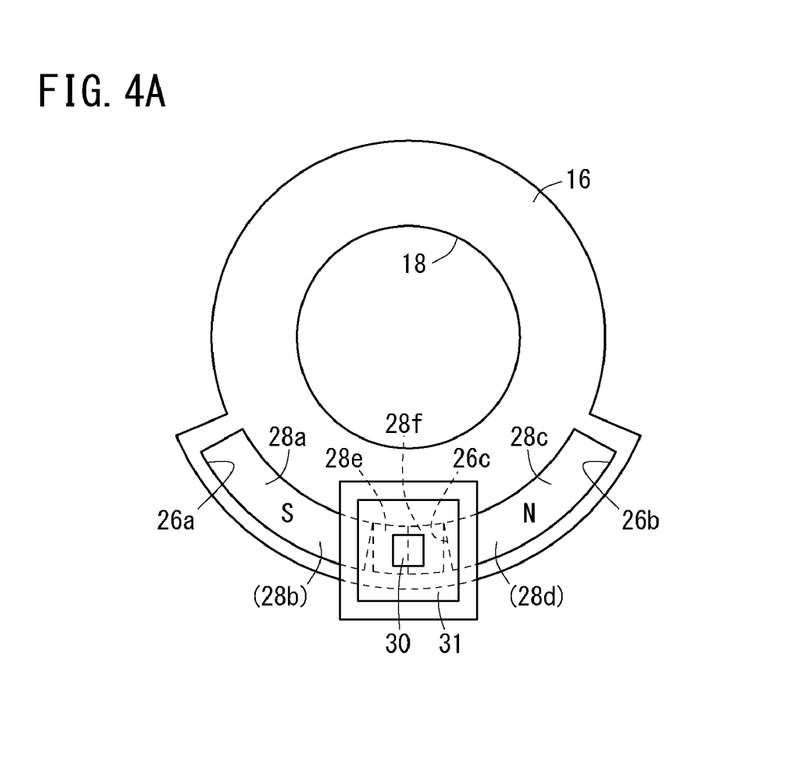
FIG. 4A and FIG. 4B are respectively a plan view of an essential part and a side view of the essential part showing the positional relationship among a rotor, magnets and a Hall element which constitute a throttle opening detection device according to another embodiment of the present invention.
Figure 4B:
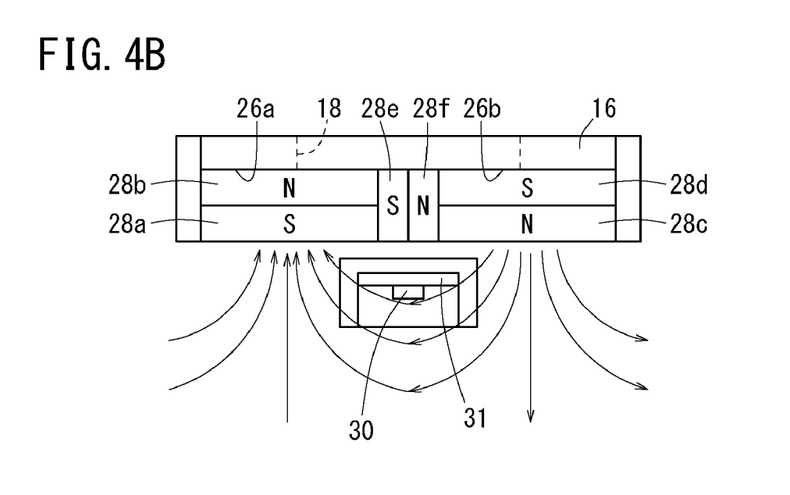

In FIG. 1, FIG. 2A and FIG. 2B, the case where a predetermined clearance is formed between the magnets 28a, 28b and the magnets 28c, 28d is exemplified. However, as shown in the embodiment of FIGS. 4A and 4B, a fitting recessed portion 26c is formed in the clearance, and additional magnets 28e, 28f may be further fitted into the fitting recessed portion 26c.

In this embodiment of the present invention, the magnets 28e, 28f are press-fit into the fitting recessed portion 26c such that the magnets 28e, 28f are arranged adjacent to each other, the polarity of the magnet 28e and the polarity of magnets 28a, 28d are the same, and the polarity of the magnet 28f and the polarity of the magnets 28b, 28c are the same. Due to such setting of polarities, a balance of a magnetic force in an intermediate range is improved so that the detection accuracy is further enhanced.

The present invention is not particularly limited to the above-mentioned embodiments, and various changes can be made without departing from the gist of the present invention.

For example, with respect to the number of magnets, only two magnets arranged adjacent to each other may be used. Also in this case, a clearance may be formed between two magnets arranged adjacent to each other or two magnets may be in close contact with each other without forming a clearance.

Further, as shown in FIG. 5, the Hall element (magnetic sensor) may be formed of a plurality of Hall elements (magnetic sensor portions). FIG. 5 shows a case where two Hall elements 30a, 30b are provided. An imaginary line L1 which connects the center of rotation O of the rotor 16 and the Hall element 30a and an imaginary line L2 which connects the center of rotation O and the Hall element 30b intersect with each other at a predetermined angle θ. In other words, the Hall elements 30a, 30b are spaced apart from each other along the circumferential direction of the rotor.

Figure 6:
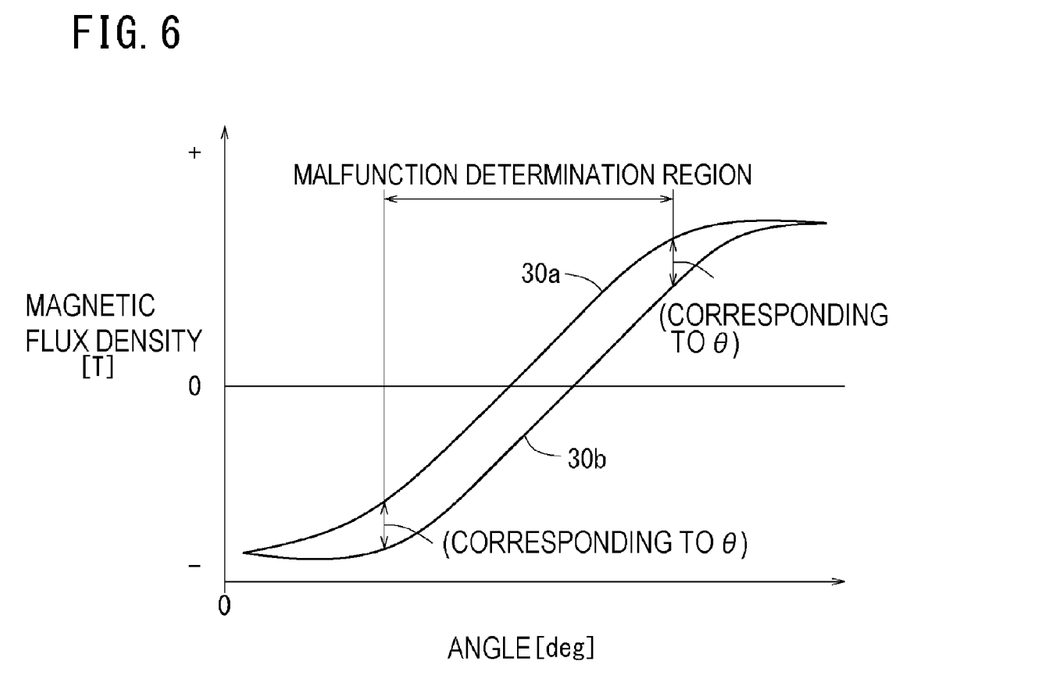
FIG. 6 is a graph showing the relationship between a rotational angle of the rotor and a magnetic flux density in the throttle opening detection device shown in FIG. 5.

In such an arrangement, as shown in the chart of FIG. 6, two outputs which differ in phase by an amount corresponding to the angle θ are obtained by the Hall element 30a and the Hall element 30b. When the differential between two outputs is calculated, and when an abnormal value is recognized, it is possible to determine that a malfunction occurs in either one of the Hall elements 30a, 30b or in both Hall elements 30a, 30b.

DESCRIPTION OF REFERENCE NUMERALS AND SIGNS

10: throttle opening detection device
12: handle bar
14: acceleration grip
16: rotor
22: return spring
24: housing
28a to 28f: magnets
30, 30a, 30b: Hall elements
32: engaging recessed portion
34: throttle pipe
36: engaging projecting portion

We claim:

1. A throttle opening detection device comprising:
 a rotor which is mounted on a handle bar and rotatable in an interlocking manner by manipulation of an acceleration grip also mounted on the handle bar;
 a plurality of magnets mounted on the rotor along the circumferential direction thereof with a spacing provided in the circumferential direction between each magnet of the plurality of magnets and with each of the magnets spaced an equal distance in an axial direction of the rotor from an end of the rotor;
 a magnetic sensor which detects a magnetic force generated by the magnets; and
 a housing which houses the rotor and the magnetic sensor and is mounted on the handle bar, wherein
 the magnets are arranged in the vicinity of a peripheral portion of one side surface of the rotor,
 the magnetic sensor is arranged to face the one side surface in an opposed manner in the axial direction of the rotor, and
 the magnets are arranged such that a correlation between a rotational angle of the rotor and a combined magnetic flux density of the magnets is linear over a rotational range of the rotor.

2. The throttle opening detection device according to claim 1, wherein the magnetic sensor is arranged at a position on a side of the rotor opposite to the acceleration grip with the rotor sandwiched therebetween.

3. The throttle opening detection device according to claim 1, wherein two of said magnets are spaced apart from each other along the circumferential direction of the rotor, and at least one additional magnet is arranged between the two magnets which are spaced apart from each other.

4. The throttle opening detection device according to claim 3, wherein the at least one additional magnet is press-fit between the two of said magnets spaced apart from each other along the circumferential direction of the rotor.

5. The throttle opening detection device according to claim 3, wherein a spaced-apart distance between the two magnets which are spaced apart from each other is set to a distance at which a degree of change in magnetic flux density corresponding to throttle opening in an intermediate range of throttle opening is decreased.

6. The throttle opening detection device according to claim 1, wherein a spaced-apart distance between the magnets is set to a distance at which a degree of change in magnetic flux density corresponding to throttle opening in an intermediate range of throttle opening is decreased.

7. The throttle opening detection device according to claim 1, further including additional magnets which have different magnetic fluxes and which are respectively laminated to the plurality magnets as back yokes.

8. The throttle opening detection device according to claim 7, wherein said rotor has a plurality of recesses indented into the one side face thereof, and the plurality magnets having the additional magnets laminated thereto are respectively disposed in the recesses.

9. The throttle opening detection device according to claim 7, wherein the plurality magnets having the additional magnets laminated thereto are spaced apart from each other along the circumferential direction of the rotor, and the throttle opening detection device further includes still other magnets which are arranged between the plurality magnets having the additional magnets laminated thereto.

10. The throttle opening detection device according to claim 9, wherein the still other said magnets are press-fit between the plurality magnets having the additional magnets laminated thereto.

11. The throttle opening detection device according to claim 7, wherein each of the plurality magnets has an opposite polarity to that of the additional magnet laminated thereto.

12. The throttle opening detection device according to claim 7, wherein the magnetic sensor is formed of a plurality of magnetic sensor portions.

13. The throttle opening detection device according to claim 12, wherein the magnetic sensor portions are spaced apart from each other along the circumferential direction of the rotor such that the outputs of the sensor portions differ in phase from each other.

14. The throttle opening detection device according to claim 1, wherein the magnetic sensor is formed of a plurality of magnetic sensor portions.

15. The throttle opening detection device according to claim 14, wherein the magnetic sensor portions are spaced apart from each other along the circumferential direction of the rotor such that the outputs of the sensor portions differ in phase from each other.

\* \* \* \* \*